United States Patent

Gilman et al.

[15] 3,692,811

[45] Sept. 19, 1972

[54] ALCOHOLATED BASIC ALUMINUM HALIDE COMPOUNDS AND METHOD OF MAKING SAME

[72] Inventors: William S. Gilman, South Plainfield; John L. Jones, North Plainfield; Andrew M. Rubino, New Providence, all of N.J.

[73] Assignee: Armour Pharmaceutical Company, Chicago, Ill.

[22] Filed: Oct. 26, 1970

[21] Appl. No.: 84,172

[52] U.S. Cl.................260/448 R, 252/8.6, 260/999
[51] Int. Cl..............................................C07f 5/06
[58] Field of Search...................260/448 R, 448 AD

[56] References Cited

UNITED STATES PATENTS

| | | | |
|---|---|---|---|
| 2,823,144 | 2/1958 | Dalton | 260/448 AD X |
| 3,472,928 | 10/1969 | Virzi | 424/68 |
| 3,523,129 | 8/1970 | Holbert et al. | 260/448 AD |
| 3,359,169 | 12/1967 | Slater et al. | 260/448 AD |
| 3,511,864 | 5/1970 | Ugelow et al. | 260/448 AD |
| 2,953,479 | 9/1960 | Heyden et al. | 260/448 R X |
| 3,420,932 | 1/1969 | Jones et al. | 260/448 AD X |
| 3,472,929 | 10/1969 | Jones et al. | 260/448 AD X |
| 3,523,130 | 8/1970 | Jones et al. | 260/448 AD |

OTHER PUBLICATIONS

Academy of Athens Record of Proceedings Vol. 6 (1931) pp. 148–153 (translation)

Primary Examiner—Tobias E. Levow
Assistant Examiner—H. M. S. Sneed
Attorney—Carl C. Batz

[57] ABSTRACT

Anhydrous basic aluminum halide complexes may be formed from hydrated or partially hydrated aluminum halides by substituting alcohol for the free and coordinated water in the hydrated compound. The anhydrous alcoholated complexes are produced by dissolving the hydrated compound in alcohol, adding dimethoxypropane (DMP) or diethoxypropane (DEP) to the solution, heating and concentrating the solution, adding additional DMP, DEP or other precipitating agent to precipitate out the alcoholated complex, and drying the precipitate. The products may be useful in antiperspirant compositions and as intermediates in non-aqueous solvents.

8 Claims, No Drawings

ALCOHOLATED BASIC ALUMINUM HALIDE COMPOUNDS AND METHOD OF MAKING SAME

The present invention relates to alcoholated basic aluminum halides and methods of making the same. More particularly, the invention is directed to a method of producing anhydrous basic aluminum halide complexes having a substantial portion of free and coordinated alcohol, and to products produced by this method which may be useful in antiperspirant compositions and as intermediates in non-aqueous solvents.

Aluminum chlorhydroxide compounds have long been used as an active ingredient in antiperspirant compositions. Furthermore, such compounds are useful in the preparation of a number of aluminum and aluminum chlorhydroxide derivatives.

However, presently known aluminum chlorhydroxide compounds have not been totally satisfactory for the above uses due to the presence of free and coordinated water in the compound. For example, aluminum chlorhydroxide compositions containing water have been known to form into highly viscous, gelantinous materials when exposed to non-aqueous alcoholic solvents. Also, the water present in hydrated aluminum chlorhydroxide has caused can corrosion in metallic aerosol dispensers, resulting in the necessity of protective inner can coatings. Furthermore, known hydrated forms of aluminum chlorhydroxide have been shown to be incompatible with Freon propellants used in aerosol type dispensers, resulting in gelation of the aluminum chlorhydroxide.

A common hydrated aluminum chlorhydroxide (commercially available under the trademark "CHLORHYDROL"of Reheis Chemical Company, a division of Armour Pharmaceutical Company) is produced by adding aluminum metal to aluminum chloride ($AlCl_3$) or HCl in water solution. If the water of hydration is removed to yield an anhydrous product, decomposition occurs resulting in insoluble products such as $Al(OH)_3$ and/or $Al_2O_3$. If the product is only partially dried to a solid form short of decomposition, the compound is alcohol insoluble and produces difficulties in some non-aqueous antiperspirant formulations, necessitating additional treatments prior to use. Also, when the compound is used as an intermediate, extreme care is necessary to prevent decomposition.

A previously known aluminum chlorhydroxide complex having a very low water content was produced by reacting anhydrous aluminum chloride ($AlCl_3$), alcohol, water, and aluminum metal in the presence of heat. The resulting product was an aluminum chlorhydroxide-alcoholate of the general formula:

$$Al_n Cl_x (OH)_y (OR)_z \cdot X H_2O$$

where $n$, $x$, $y$ and $z$ are integers such that $x+y+z=3n$, R is an alkyl group, and X may be zero to several weight percent of the total compound. Although these basic alcoholates were considered for antiperspirant use, they yielded products which were too acidic for topical use, and they lack the ionic nature necessary for an effective antiperspirant. While such an alcoholate derivative of aluminum chlorhydroxide may be made more ionic through chemical reaction, the product is not very labile for substitution.

Attempts were also made to use aluminum alkoxides, produced by adding aluminum metal to an alcohol in the presence of a catalyst or by adding aluminum chloride to a sodium alkoxide (NaOR), where R is an alkyl group. However, these products were found to lack the necessary ionicity for antiperspirant use. Although the products could be made more ionic by adding aqueous ionic compositions to them, this would reintroduce undesirable water into the products. Also the alkoxides hydrolyze vigorously with water and decompose readily when employed as intermediates.

Accordingly, it is an object of the present invention to produce an anhydrous basic aluminum halide compound which is soluble in and compatible with both aqueous and non-aqueous media, such as those used in antiperspirant formulations.

It is a further object of the present invention to produce an anhydrous basic aluminum halide composition which will not gel in non-aqueous systems and solvents.

Another object of the present invention is to produce a compound which will serve as a chemical intermediate in the formation of usable derivatives of aluminum and aluminum halides without decomposition.

Still another object of the present invention is the production of a basic aluminum halide compound which will not result in can corrosion when used in metallic aerosol dispensers.

A still further object of the present invention is to develop a method of producing an anhydrous basic aluminum halide compound which will satisfy the above objects.

Other objects will appear hereinafter.

The above objects are achieved by the present invention by forming a non-hydrated alcoholic form of basic aluminum halide in which alcohol molecules replace substantially all of the free and coordinated water molecules and become chemically and/or physically bound so as to constitute an integral portion of the complex basic aluminum halide entity. The non-hydrated, alcoholic form of the basic aluminum halide will have a water content of less than about 2 percent by weight.

The above objects are further achieved by the process of our invention which involves the reaction of a ketal or dialkoxyalkane, particularly dimethoxypropane or diethoxypropane, in an alcohol solvent with a water molecule of the hydrated basic aluminum halide. As a result of this reaction, the ketal is chemically converted into a ketone, which is volatilized off, and an alcohol. The resulting alcohol and/or the alcohol solvent present in the system then takes over the vacant water sites on the basic aluminum halide molecule and becomes chemically and/or physically bound in some manner to form an anhydrous alcoholated basic aluminum halide.

Although the use of one particular ketal (2, 2' - dimethoxypropane) as a water-removing agent is known, the use of this and other ketals such as 2, 2' - diethoxypropane in forming alcoholated basic aluminum halides is, to our knowledge, novel and unexpected.

The hydrated basic aluminum halide compounds used in the formation of the products of the present invention are represented by the general formula:

$$Al_n (OH)_x A_y \cdot X H_2O$$

where small $n$, $x$, and $y$ are integers such that $x+y=3n$; X may be from 2 to 4 and need not be an integer; and A may be chlorine, bromine, iodine or mixtures thereof.

Of particular interest for use in the present invention are the highly basic aluminum halides of the above formula where $x=5$, $y=1$ and $n=2$. Products of the present invention may also be made from glycol complexes and other derivatives of the above basic aluminum halides, as described more fully below.

The first step in the process of the present invention is to dissolve the hydrated basic aluminum halide in alcohol. Virtually any solvent in which the hydrated basic aluminum halide is soluble could be used, and ethanol and methanol are particularly suitable. However, the use of solvents such as the higher molecular weight alcohols, including propanol, butanol, secondary butanol and isopropanol, have not exhibited promise for the conversion of 5/6 basic aluminum halides due to the insolubility of the salts in these alcohols. The above mentioned alcohols may, however, be used in the conversion of glycol complexed basic aluminum halides, as discussed more fully below.

The basic aluminum halide compound is preferably dissolved in the alcohol to the extent of about 30 weight per cent. This solution is, in turn, diluted with additional alcohol so that a volume of at least about five times that of the original solution volume is achieved.

To this solution is added a ketal (also referred to as a dialkoxyalkane) having two methoxide or ethoxide groupings. Of the ketals tried in the process of the present invention, 2,2'-dimethoxypropane (DMP) and 2,2'-diethoxypropane (DEP) are preferred. On the other hand, dimethoxymethane, diethoxymethane and 1,1'-diethoxyethane have not been found to yield satisfactory dehydrated products, although slight water content reduction is realized.

The ketal is added to the alcoholic solution to an extent in excess of the amount needed to react with all of the water present on the basic aluminum halide compound and to allow for its further reaction with additional water which may be present in the solution and assure substantially complete dehydration of the aluminum compound. It is preferred that about four mols of ketal be added for each mol of water present on the basic aluminum halide. It is also preferred that the addition be made with constant agitation of the solution in order to prevent premature precipitation of the alcoholated product.

The resulting solution is heated, preferably with steam at 100° C, to volatilize the ketone formed and concentrate the solution by evaporation until the solution volume is about one third or less of its original volume before heating. The solution is then cooled to about 25° to 30° C.

To the cooled solution is then added an additional excess of the ketal to precipitate the product out of the concentrated solution. Excesses to an extent of about three mols of ketal for each mol of water on the basic aluminum halide compound are efficient in recovering yields of greater than 90 percent. It is also possible to use precipitating agents other than the dialkoxyalkanes, such as alcohols, ethers, ketones, alkanes, etc. The only essential criteria for the precipitating agent are that the derivative not be soluble in it and that it not contaminate the derivative.

Finally, the resulting precipitate is dried to produce a solid product. The method of drying the precipitate is important insofar as it is necessary to minimize water contamination and excessive alcohol volatilization. Accordingly, it is necessary that there be a minimum of exposure to atmospheric water and that relatively low drying temperatures be used. Preferably, the precipitate is dried under vacuum of one half atmosphere at temperatures below 40°C until a free-flowing powder is obtained having the desired alcohol content. Alcohol contents of about 10 to 40 percent by weight may be attained, with a range of about 20 to 30 percent being preferred. Free and coordinated water contents of less than 2 percent by weight are also attained.

Although the precise nature of the chemical reaction involved in the method of the present invention is not known, the mode of bonding of the alcohol to the basic aluminum halide is expected to be quite complex and not unlike that of the water bonding to basic aluminum halides. Furthermore, though applicants do not wish to be bound by any particular theory, it is believed that an intermediate of short life is formed between the water and the dehydrating agent, and hence, the replacement of water molecules with alcohol molecules is not expected to proceed strictly on a one to one basis.

All alcohol and water analyses were performed by employing a Beckman model GC-5 Gas Chromatograph which incorporated a thermal conductivity detector. For methanol, water and ethanol, an 8-foot copper column of 0.25 inch O.D. packed with Paropak Q (80–100 mesh), with a column temperature of 150°C, detector temperature of 190°C, an inlet temperature of 160°C, and a gas flow of 50 mls. of He per minute were employed. For the other alcohols, a 6-foot copper column of the same O.D. as above was employed with Paropak N in the mesh range as previously described. The column specifications in these cases were as above except the detector temperature was 200°C and the inlet temperature was 210°C.

The products and methods of the present invention may be understood more fully with reference to the following specific examples:

EXAMPLE I

A 100 gram sample of spray-dried aluminum chlorhydroxide (prepared according to the method described in copending application entitled "Alcohol Soluble Basic Aluminum Chlorides and Method of Making Same", filed on even date herewith and assigned to the same assignee as the present application), assaying approximately 25.0 per cent aluminum, 17.0 per cent chloride and 22.0 per cent water, was dissolved in 800 grams of methanol. To this solution was added with constant agitation 500 grams of DMP. The resulting solution was steam heated, concentrated to about 30 per cent of its original volume, and cooled to about 25° to 30°C. To the cooled solution was added about 400 grams of additional DMP. The precipitate was collected and dried under a one half atmosphere vacuum at temperatures below 40° C. The yield was about 90 to 95 per cent and a product analysis showed the product to contain about 20 per cent aluminum, 15 per cent chloride, one per cent water, and 30 per cent methanol.

EXAMPLE II

A sample of spray-dried aluminum chlorhydroxide was processed as in Example I, except that the sample was dissolved in ethanol, and DEP was substituted as the dehydrating and precipitating agent. A similar yield and product analysis to that in Example I was obtained, except that the product contained about 30 per cent ethanol instead of methanol.

EXAMPLE III

A 10 gram sample of 5/6 basic aluminum chloride, assaying 23.7 per cent Al, 16.2 per cent Cl and 24.4 per cent $H_2O$, was dissolved in 500 mls. of MeOH. To this solution was added 450 mls. of DMP, after which the system was concentrated on a steam bath to a volume of 200 mls. and cooled to room temperature. An additional 100 mls. of DMP was then added, and the resulting precipitate was filtered and vacuum dried to a free flowing product which was found to contain 21.3 per cent Al, 13.7 per cent Cl, 0.5 per cent $H_2O$, and 38.5 per cent MeOH.

EXAMPLE IV

A 30 gram sample of a 10 per cent solution of 5/6 basic aluminum bromide in ethanol was diluted with 50 mls. of additional ethanol. To this mixture was added 125 mls. of DMP. The solution was then concentrated to 50 mls. volume on a steam bath. After cooling of he system, and additional 100 mls. of DMP was added for precipitation of the product. The filtered and dried product was found to contain 13.1 per cent Al, 15.0 per cent Br, 0.7 per cent $H_2O$, 26.1 per cent MeOH and 13.2 per cent EtOH.

EXAMPLE V

A 6 gram sample of basic aluminum chloride (22.4 per cent Al, 15.1 per cent Cl, 28.7 per cent $H_2O$) was dissolved in 20 grams of methanol. Ten grams of the above solution were then diluted with 75 mls. of methanol, and 50 mls. of DMP were added to the diluted solution. The system was then concentrated to 20 mls. on a steam bath and cooled. The product was precipitated by the addition of 50 mls. of DMP, after which the product was filtered and dried. The analysis showed the product to contain 19.6 per cent Al, 13.2 percent Cl, 17.3 per cent MeOH and less than 0.1 per cent $H_2O$.

EXAMPLE VI

A sample of basic aluminum chloride (25.4 per cent Al, 17.2 per cent Cl, 22.1 per cent $H_2O$) was processed in the same manner as Example V, except that acetone was used to precipitate the product. The resulting product was found to contain 19.7 per cent Al, 13.7 per cent Cl, 1.5 per cent $H_2O$ and 29.7 percent MeOH.

EXAMPLE VII

The product of Example VI, which contained 29.7 per cent MeOH, was redissolved in ethanol and redried. The resulting new product contained 35.5 per cent EtOH.

EXAMPLE VIII

A 5 gram sample of 5/6 basic aluminum iodide (17.6 percent Al, 42.8 percent I, and 12.1 percent $H_2O$) was dissolved in 200 mls. of ethanol. To this solution was added 200 mls. of DMP. The solution was concentrated to a volume of 100 mls. on a steam bath and then cooled to room temperature. To this solution an additional 100 mls. of DMP was added to cause precipitation. The precipitate was removed from solution by filtration and dried to a free-flowing powder product. This product was found to contain 15.1 per cent Al, 32.0 per cent I, 12.1 per cent EtOH, 18.4 per cent MeOH, and 2.8 per cent $H_2O$.

In addition to the use of the usual hydrated forms of the basic aluminum halides as the starting material for the process of this invention, the present invention also contemplates the conversion of other forms of the basic aluminum halides, such as the glycol complexed basic aluminum halides, as illustrated in the following examples:

EXAMPLE IX

A sample of propylene glycol complexed 5/6 basic aluminum chloride (such as that described in U. S. Pat No. 3,420,932, and obtained from the Reheis Chemical Company under the trademark "REHYDROL") was dissolved in propanol and DMP was added as the dehydrating agent. The solution was then processed as in Examples I and II above, and the resulting dried product was shown to contain (by weight): 27.2 per cent propanol, 11.6 per cent MeOH, 0.8 per cent $H_2O$), and 4.7 per cent propylene glycol.

EXAMPLE X

A 2 gram sample of Rehydrol was dissolved in 50 mls. of ethanol, and 50 mls. of DEP were added to the solution. The solution was then concentrated on a steam bath to a volume of 25–30 mls. After cooling the solution, 25 mls. of DEP was added, and the resulting precipitate was vacuum filtered and dried. The product analysis showed 14.5 per cent Al, 9.8 per cent Cl, 0.6 per cent $H_2O$, 35.9 per cent EtOH, and 9.6 per cent propylene glycol.

EXAMPLE XI

A 3 gram sample of Rehydrol (20.3 per cent Al, 13.8 per cent Cl, 6.7 per cent $H_2O$, 31.9 per cent propylene glycol) was dissolved in 100 mls. of butanol. The Rehydrol solution was then dehydrated with 100 mls. of DMP, after which the solution was heated on a steam bath and concentrated to a volume of 20–25 mls. To the cooled solution was added 80 mls. of DMP, and the precipitated product was filtered and dried. The dried product was found to contain 8.9 per cent Al, 6.2 per cent Cl, 0.5 per cent $H_2O$, 3.4 per cent propylene glycol, 8.6 per cent MeOH and 42 per cent butanol.

EXAMPLE XII

A 10 gram sample of Rehydrol (19.9 per cent Al, 13.8 per cent Cl, 30.2 per cent propylene glycol, 8.6 per cent $H_2O$) was dissolved in 450 mls. of methanol. To this solution was then added 500 mls. of DMP. This system was concentrated on a steam bath to 200 mls.

volume and cooled to room temperature. To the cooled solution was then added an additional 200 mls. of DMP for precipitation of the product. The precipitate was dried under vacuum to a free flowing powder state and assayed 19.1 per cent Al, 13.0 per cent Cl, 6.1 per cent propylene glycol, 1.1 per cent $H_2O$ and 38.2 per cent MeOH.

EXAMPLE XIII

An equal weight aliquot of the same Rehydrol batch used in Example XII was treated identically with the sample in XII except that 500 mls. of ethanol was used as the solvent instead of methanol. The product analysis showed: 16.9 per cent Al, 11.4 per cent Cl, 5.0 per cent propylene glycol, 0.7 per cent $H_2O$, 19.6 per cent EtOH and 18.1 per cent MeOH.

It will be noted from the above examples that the particular alcohol solvent used in the process of the present invention need not correspond with the particular dehydrating or precipitating agent used. That is, it is not necessary that methanol be used with DMP and ethanol be used with DEP, as for example in Examples I–III and XII. However, where the alcohol and dehydrating agent do not correspond, the resultant product will tend to contain the alcohols of two different alkane groups, such as in examples IV, IX nd XIII.

The products of all of the above examples are alcohol soluble and stable for substitution and derivative production, such as by incorporating an alcohol soluble substance directly into the complex or by replacing the alcohol groupings with other groups. For example, the products may be reacted with stearic acid in an alcohol solution to form a textile impregnating agent which renders a woven textile fabric waterproof.

Furthermore, the ionic character necessary for effective antiperspirancy and/or astringency is maintained in the above alcoholated species. For example, the pH of a 30 per cent solution of the above products in anhydrous ethanol is about 2.2 to 2.3, which corresponds to a relative pH in water of about 4. Therefore, any of the above products except those containing methanol, which is highly toxic, could be used in antiperspirant compositions.

In addition, the above products show a high degree of compatibility with the halogenated hydrocarbons which are conventionally used as aerosol propellants for antiperspirant compositions. For example, the carbon tetrachloride compatibility (defined as the number of cubic centimeters of $CCl_4$ to effect a permanent cloudiness to 60 grams of a 30 per cent solution of the product in anhydrous ethanol) of the methanolated and ethanolated products ranged from about 240 to 464 cubic centimeters of $CCl_4$ per standard test sample. These results compare favorably with the values of between 150 and 200 cubic centimeters $CCl_4$ for the propylene glycol complexed basic aluminum chlorides shown in U. S. Pat. No. 3,420,932.

On the interpretation of the foregoing specification and the following claims, it is to be understood that the term "hydrated" refers to the presence of free and/or coordinated water on the basic aluminum halide compound, which water is either chemically bound to or physically associated with basic aluminum halide molecules.

The present invention may be embodied in other specific forms without departing from the spirit or essential attributes thereof and, accordingly, reference should be made to the appended claims, rather than to the foregoing specification as indicating the scope of the invention.

We claim:

1. A substantially anhydrous basic aluminum halide complex comprising an alcoholated basic aluminum halide of the general formula:

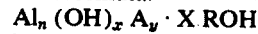

$$Al_n(OH)_x A_y \cdot X\ ROH$$

wherein $x$, $y$ and $n$ are integers such that $x+y=3n$; ROH is at least one alcohol selected from the group consisting of methanol, ethanol, propanol, butanol, and isomers and mixtures thereof; X is a number such that the total amount of free and coordinated alcohol in the complex is about 10 to 40 weight percent of the complex; and A is a halogen selected from the group consisting of chlorine, bromine, iodine and mixtures thereof.

2. A substantially anhydrous basic aluminum halide complex according to claim 1 wherein the complex also includes a minor proportion of glycol bound to the complex.

3. A substantially anhydrous basic aluminum halide complex according to claim 1 wherein the free and coordinated alcohol in the complex is about 20 to 30 weight per cent of the complex.

4. A method of making a substantially anhydrous alcoholated basic aluminum halide complex comprising the steps of dissolving an at least partially hydrated basic aluminum halide compound in alcohol selected from the group consisting of methanol, ethanol, propanol, butanol, and isomers and mixtures thereof, adding to the solution a dialkoxyalkane selected from the group consisting of 2,2'-dimethoxypropane and 2,2'-diethoxypropane, heating the solution, concentrating the solution, precipitating out the alcoholated basic aluminum halide complex, and drying the precipitate.

5. A method according to claim 4 wherein the halide is selected from the group consisting of chloride, bromide, iodide and mixtures thereof.

6. A method according to claim 4 wherein the precipitating step is carried out by adding to the concentrated solution a precipitating agent selected from the group consisting of 2,2'-dimethoxypropane and 2,2'-diethoxypropane.

7. A method according to claim 4 wherein the basic aluminum halide compound is a glycol complex of a basic aluminum chloride.

8. A method according to claim 4 wherein the solution is cooled after concentrating.

* * * * *